Figure 1:
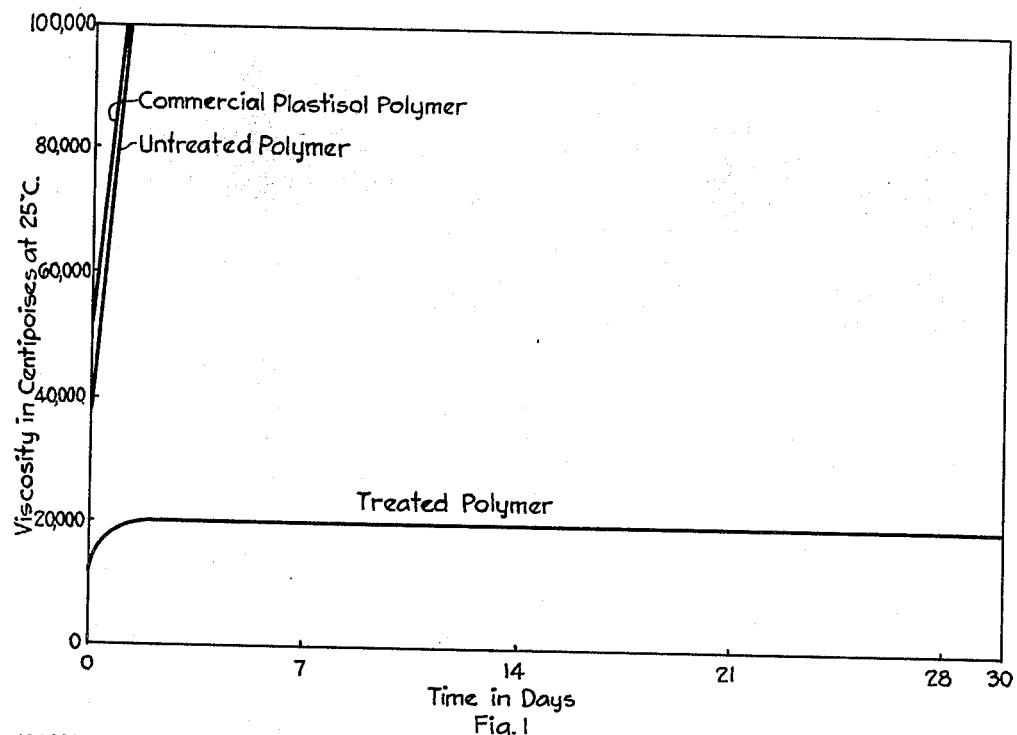

Inventors: Fred E. Condo
Jerome R. Vinograd
By James H. Parker
their Attorney

Patented Apr. 6, 1954

2,674,593

UNITED STATES PATENT OFFICE 2,674,593

PRODUCTION AND TREATMENT OF VINYL CHLORIDE POLYMER

Fred E. Condo, El Cerrito, and Jerome R. Vinograd, Berkeley, Calif., assignors to Shell Development Company, Emeryville, Calif., a corporation of Delaware Application July 24, 1951, Serial No. 238,218

6 Claims. (Cl. 260—92.8)

This invention relates to a process for production and treatment of vinyl chloride polymer whereby the polymer is rendered particularly suitable for use in plastisols.

Plastisols are compositions containing finely divided polymer of vinyl chloride having high molecular weight dispersed and suspended in a liquid organic plasticizer for the polymer. At room temperature, the compositions are spreadably fluid and have the consistency of paste. Upon being heated to an elevated temperature, the compositions undergo fusion with dissolution of the polymer particles, and after cooling, solidification occurs to give plastic products with excellent physical properties.

In order that plastic compositions containing vinyl chloride polymer will have good properties of flexibility and strength, it is necessary to plasticize the polymer with a substantially non-volatile plasticizer. The plastisols are compounded with the liquid plasticizer in proper amount to obtain desired physical properties in the ultimate plastic compositions, and they contain only this liquid plasticizer as the vehicle wherein the particles of polymer are dispersed and suspended. Consequently, plastisols are very useful as starting materials for manufacture of a great variety of articles. They are free of solvents or other materials which would have to be volatilized and evaporated in use, and thus, the plastisols greatly simplify the technique of manufacture of plastic articles. For example, plastisols are readily applied to fabrics by spreading or impregnating followed by heating with or without calendering whereby a film of the plastic reinforced with the fabric is obtained. The mobile character of plastisols also enables manufacture of plastic articles in simple open molds which do not require use of pressurizing equipment. Coated or filmed articles such as plastic gloves are easily produced from plastisols by a dip procedure which involves dipping a form into the fluid composition, subjecting the coated form to heat so as to gelatinize and fuse the plastisol, and then cooling to set up the fused gel.

Plastisols are seen to be very suitable for employment in a variety of applications, but it is essential that they possess certain properties in order to permit satisfactory use. The physical state of polymer of vinyl chloride intended for use in plastisols is of paramount importance. The polymer particles must be quite small to prevent separation and loss of suspension in the liquid plasticizer. The small particle size also prevents formation of excessively grainy character in films, coatings and the like after fusion of the plastisols. The surface of the polymer must not be too large because this leads to unduly rapid rate of polymer dissolution at storage temperature, as well as to increased amount of liquid held in surface layers. The polymer particles must have very low porosity and aggregation to provide fluidity to the plastisols and to minimize immobilization of the vehicle. The size distribution of the polymer particles is required to be such that efficient packing is achieved in the plastisols. Otherwise too much plasticizer is required to give fluid consistency to the plastisols and the ultimate plastic compositions are unduly soft.

While grades of polymer suitable for use in plastisols have been obtained in the past by selection from various random lots of produced polymer on the basis of empirical tests, and plastisols of suitable initial fluidity have been manufactured therefrom, even these plastisols have been subject to an adverse property which has limited their wider use. Not only must the plastisols have the ability to gel completely and uniformly in a short time at an elevated temperature, but it is highly desirable that they retain mobile fluidity over extended periods of time so that they can be stored after preparation, and used when desired. Customary plastisols undergo an increase in viscosity in a relatively short period of time with the result that they soon lose their fluidity and acquire an immobile consistency. This lack of stability with respect to increase in viscosity of customary plastisols has necessitated their use in fabrication of plastic materials therefrom comparatively soon after compounding.

We have now discovered a process for producing polymer of vinyl chloride which always provides a type of polymer suitable for use in plastisols, and further, enables compounding of plastisols from the polymer that retain their mobile fluidity upon storage over extended periods of time. The process of the invention involves utilization of a combination of steps in seriatim. Each of the steps of the process is essential and they have an interlocking effect on the desired end result, namely, production of polymer of vinyl chloride which can be compounded into plastisols having desired properties of fluid mobility, uniform consistency and formability into plastic articles by heating as well as the property of increasing in viscosity at only a very slow rate so that fluid mobility is retained for a long time.

According to the process of the invention, liquid monomeric vinyl chloride having not more than about 5% by weight of another polymerizable mono-olefinic compound in admixture therewith and also containing a peroxide catalyst dissolved therein is emulsified with an aqueous solution of an emulsifying agent. The emulsion is next homogenized by subjecting it to violent shearing action such as by passing it through a colloid mill or forcing it through apertures under a high pressure drop. The homogenized emulsion is then subjected to heating with agitation at a temperature of about 30° C. to 60° C. to thereby polymerize the vinyl chloride and produce a very stable emulsion of polymer. Prior to coagulation of the polymer, the aqueous emulsion of polymer is heated without appreciable polymerization of any vinyl chloride therein at about 90° C. to 160° C. for a time of about 10 seconds to less than that time required to appreciably agglomerate and coagulate the polymer particles, during the whole time of which the polymer particles are maintained in intimate contact with liquid water. The heat-treated polymer latex is then subjected to a customary procedure for coagulation, separation, washing, and drying of the polymer. The resulting finely divided polymer is ideally suited for compounding into plastisols having the combination of properties shown hereinbefore as desirable.

In order to have polymer of good quality for use in plastisols, the polymer has high molecular weight. This is assured in the present process by use in combination of three features, namely, the monomer subjected to polymerization, the temperature of polymerization, and the use of a monomer-soluble peroxy polymerization catalyst. It has been found best to employ vinyl chloride as sole polymerizable compound. However, polymer which may be employed in plastisols is obtainable provided not more than about 5% by weight of another mono-olefinic polymerizable compound is mixed with the vinyl chloride subjected to polymerization in the process. For this purpose, vinyl acetate is particularly suitable, but other mono-olefinic compounds which contain the polymerizable group $CH_2=C<$ and no other polymerizable group such as vinyl bromide, vinyl formate, vinyl benzoate, vinylidene chloride, methyl acrylate, acrylonitrile, methyl methacrylate, styrene and the like, may be used.

About 0.1 to 5% of monomer-soluble peroxy polymerization catalyst is dissolved in the liquid vinyl chloride alone or the liquid mixture of vinyl chloride containing the limited amount of other mono-olefinic compound. Lauroyl peroxide gives excellent results and its use is preferred. Other suitable peroxides include caprylyl peroxide, stearoyl peroxide, benzoyl peroxide, acetyl benzoyl peroxide, p-chlorobenzoyl peroxide, 2,4-dichlorobenzoyl peroxide, tertiary-butyl perbenzoate, and like monomer-soluble, substantially water-insoluble peroxides well known in the art. The amount of peroxide used is not very critical. While proportions greater or less than the 0.1 to 5% by weight based upon the weight of monomer may be employed, it is preferred generally to use about 0.2 to 1%. Very good results are obtained with about 0.3% of lauroyl peroxide.

The liquid vinyl chloride containing the peroxide catalyst is mixed and emulsified with an aqueous solution containing an emulsifying agent in usual fashion such as by stirring, for example. Based upon the weight of vinyl chloride, about 200 to 500% of aqueous solution is used. While larger proportions may be employed, their use is generally avoided because no advantage is realized. In fact, larger proportions result in necessity of correspondingly larger equipment and processing costs which are undesirable. In general, about 300% aqueous solution gives good results and is used, although from about 250 to 400% is also very suitable.

The aqueous solution contains one or more of the customary emulsifying agents employed in emulsion polymerization processes such as soaps like sodium or potassium myristate, laurate, palmitate, oleate, stearate, rosinate and/or hydroabietate; alkali metal alkyl or alkylene sulfates or sulfonates, particularly of 10 to 20 carbon atoms, such as sodium or potassium lauryl sulfate, cetyl sulfate, oleyl sulfonate, alkylbenzene sulfonate, and/or stearyl sulfonate; sodium salt of a sulfonated oil, for example, Turkey red oil or sulfonated mineral oils; sorbitan monolaurate, monostearate, or mono-oleate and their polyethylene glycol ethers; sodium salt of dioctyl sulfosuccinate; cetyl dimethyl benzyl ammonium chloride or lauroyl pyridinium chloride; and the like. Sodium lauryl sulfate is particularly preferred among the ionic emulsifying agents for use in the present invention, especially when about 0.1 to an equal part by weight of a higher alcohol such as lauryl alcohol is used in combination therewith. Another and separate group of substances are the emulsifying agents which are ammonium salts of mono-acids containing at least eight carbon atoms such as ammonium laurate or stearate. As described and claimed in the application of Fred E. Condo and Herbert A. Newey, Serial No. 238,394 filed of even date herewith, use of the ammonium salts enables production of polyvinyl chloride suitable for plastisol uses as well as giving plasticized polymer of extremely high electrical resistivity. The amount of emulsifying agent employed in the aqueous solution may be varied considerably. Ordinarily the concentration is about 0.1 to 2% by weight, although up to 5% is suitable. Very good results are obtained by using about 0.5% by weight of emulsifying agent in the aqueous solution, especially with sodium lauryl sulfate.

In order to obtain the polymer in a form that will permit preparation of a plastisol of proper character, the aqueous emulsion of liquid vinyl chloride is homogenized prior to polymerization of the monomer. Homogenization of the emulsion referred to herein has reference to the accepted meaning in the emulsification art, namely, that the dispersed globules of very different diameters initially present in an emulsion have been reduced to a substantially equal diameter which is many times smaller than the average diameter of the globules present when the emulsion is first formed by ordinary mixing or stirring. In the process of the present invention, the aqueous emulsion is homogenized by subjecting it to violent shearing action. Various machines and means may be employed to effect the homogenization. The homogenization of the emulsion can be attained in a colloid mill where the emulsion is passed between a rotor and stator with very small clearance, and the action of the rapidly rotating rotor subjects the emulsion to extreme disruptive forces resulting in formation of very fine dispersions. Since the emulsion employed in the invention contains liquid vinyl chloride which is a gas at ordinary temperatures, it is necessary to maintain the emulsion under pressure to keep the vinyl chloride in liquid state. It is, therefore, preferred to effect the homogenization by forcing the emulsion through an orifice or homogenizing valve where the rapid rate of passage through the aperture results in violent shearing action on the emulsion and reduces the globules of liquid monomer to a small state of subdivision.

In the process, the homogenization of the monomer emulsion is such that the polymer particles in the formed polymer emulsion are predominantly within the range of about 0.3 to 1.3 microns size and the majority are about 1 micron size. An insignificant proportion of about 1 to 3% of the weight may be present that has dimensions outside the noted range. This homogenization of the monomer emulsion is not obtained with ordinary agitation employing a customary stirrer in a polymerization vessel. It is necessary to use a homogenizer of some type in order to effect the needed homogenization. However, it is undesirable to homogenize to such extent that the average particle size of the polymer is materially smaller than indicated above because the plastisol prepared from such polymer will tend to be unduly thixotropic. Very suitable homogenization can be obtained by passage of the emulsion at least once through an aperture of not above about 0.03 inch diameter such as about 0.005 to 0.03 inch diameter at sufficient rate so there is a pressure drop of above 100 pounds per square inch across the aperture. Preferably two passes at such rate that there is a pressure drop of about 200 pounds per square inch across an aperture of about 0.016 inch diameter are employed. The pressure drop across the aperture has reference to the difference between the pressures before and after passage of the emulsion through the aperture. The pressure on the emulsion after passage through the aperture is, of course, at least sufficient to maintain the vinyl chloride in liquid condition. If desired, a single passage of the emulsion through a series of apertures with suitable pressure drop across each can be used as well as a plurality of apertures with flow therethrough in parallel relationship.

Polymerization of monomer in the homogenized emulsion is effected by heating the emulsion with agitation at a temperature below 60° C. The temperature of polymerization is of extreme importance because, as noted previously, it is desirable that the polymer have high molecular weight for use in plastisols, and because the temperature of polymerization has a direct effect on the molecular weight of the polymer. Polymerization of vinyl chloride at temperatures appreciably above 60° C. gives a polymer of too low molecular weight for plastisol use. By polymerizing at a temperature of about 30° C. to 60° C., the polymer has proper molecular weight. However, it is generally preferred to operate at about 40° C. to 45° C.

The polymerization of monomer in the homogenized emulsion is effected in usual fashion while using a temperature within the above-noted limits. Thus there is used a closed vessel fitted with an agitator and means for initially heating the contents as well as means for such cooling as may be necessary to remove the exothermic heat of reaction after the polymerization is under way. Any vapor space in the reaction vessel is kept free of oxygen which inhibits the reaction, and sufficient pressure is employed to maintain the homogeneously emulsified vinyl chloride in liquid state.

The homogenization of the monomer emulsion prior to the polymerization enables production of a very stable emulsion of polymer. While one principal object of this invention is the further treatment of the polymer emulsion so that a grade of polymer ideally suited for use in plastisols will be obtained, the stability of the polymer emulsion makes it useful for other purposes such as impregnating fabrics, paper and the like with the polymer.

The importance of the step of the process of the invention that involves homogenization of the emulsion will be evident from the following examples, but the invention is not to be construed as limited to details described therein.

EXAMPLE 1

The homogenization of a vinyl chloride emulsion was effected in an apparatus comprising two stainless steel cylinders connected with a ¼-inch tubing having an orifice therein of $1/64$-inch diameter through a 0.01-inch platinum plate. The cylinders were also connected with another ¼-inch tubing as by-pass to permit transfer of the contents of one cylinder to the other without passage through the orifice. The contents of the cylinders were forced from one to the other with nitrogen gas under pressure. The apparatus was operated with the cylinder undergoing filling being maintained at 100 pounds per square inch and the other cylinder at 300 pounds pressure so there was a pressure drop across the orifice of 200 pounds.

In parts by weight, the polymerization recipe used was 0.3 part lauroyl peroxide dissolved in 100 parts liquid vinyl chloride which was emulsified in 300 parts of water containing 1.5 parts of sodium lauryl sulfate (Duponol ME). Material of the foregoing recipe was placed in one cylinder of the apparatus and emulsified by two passes through the by-pass after which it was transferred to an elongated glass polymerization tube which was nearly filled and then hermetically sealed. Another batch of the foregoing recipe was charged to one cylinder of the apparatus, emulsified with two passes through the by-pass, and then homogenized by two passes through the orifice across which there was a pressure drop of 200 pounds per square inch. The homogenized emulsion was also transferred to a glass polymerization tube and hermetically sealed.

Polymerization of the liquid vinyl chloride in the tubes was effected by slowly tumbling the tubes in a thermostat bath set at 40° C. for 28 hours. The polymer was recovered by cooling the tubes, opening, adding three volumes of methanol to the contents to effect coagulation, allowing the polymer particles to settle and decanting the liquid. Methanol was again added to the polymer after which the mixture was filtered. The polymer was dried at about 30° C. under vacuum.

Plastisols were prepared from the two polymers by mixing with an added 50% by weight of di(2-ethylhexyl) phthalate. The two plastisols were surprisingly different in character. The plastisol prepared from the polymer produced without homogenization of the monomer emulsion was characterized by comparatively high viscosity (low fluidity), and it displayed the undesirable property of dilatancy. On the other hand, the second plastisol prepared with polymer obtained from the homogenized monomer emulsion was a smooth fluid of comparatively low viscosity.

EXAMPLE 2

An aqueous emulsion of liquid vinyl chloride was homogenized by pumping through a throttling valve. The polymerization recipe used was as described in Example 1. The emulsion was pumped with a reciprocating pump from a glass container through the throttling valve and into a vessel pressured with sufficient nitrogen to prevent boiling of the vinyl chloride. The mixture was passed five times through the throttling valve which was adjusted so that a back pressure of 500 to 1000 pounds per square inch developed. The stable monomer emulsion was polymerized in a tumbling tube as described in Example 1, and the polymer was recovered in the same manner. A plastisol was prepared from the polymer using an added 50% by weight of di(2-ethylhexyl) phthalate. The plastisol had a smooth, fluid consistency.

In order that the plastisol will have the property of retaining a workable fluid consistency over extended periods of time, it is essential that the emulsion of polymer be subjected to the heat treatment prior to coagulation of the polymer. As described hereinbefore, this step of the process of the invention involves heating the emulsion of polymer at about 90° C. to 160° C. for a time of about 10 seconds to less than the time which causes appreciable agglomeration and coagulation of the polymer particles which, during the whole time of heating, are maintained in contact with liquid water. It is not fully understood what happens to the polymer particles during the heat treatment, but it will be evident from data presented later that the particles after treatment are conditioned so that plastisols prepared therefrom have very different and significant viscosity characteristics which greatly enhance their utility.

The heat treatment needed to achieve the desired effect is obtained in a very short time which in general is at most only a few minutes. As shown in examples given hereinafter, the time of heating for effecting the heat treatment in the process of the invention is from 15 seconds up to 10 minutes. For optimum results, the time and temperature are correlated. For example, with polyvinyl chloride emulsion, heating for 15 seconds is adequate at 140° C., but it will require about twice as long at 110° C. to obtain the same effect. As a customary matter, the time and temperature are correlated so that when the resultant polymer is compounded into a plastisol consisting of two parts by weight of polymer and one part by weight of di(2-ethylhexyl) phthalate, the viscosity of the plasticol will be less than 40,000 centipoises at 25° C. after storage at 25° C. for 30 days' time from compounding the plastisol. Ordinarily, operation at a temperature of about 100° C. to 140° C. is preferred. The maximum length of time for heating is not unduly critical. The heating is merely not continued until there is appreciable agglomeration and coagulation of the emulsified polymer particles, which fact is readily determined by visual examination of the polymer emulsion. There is usually no coagulation whatsoever.

Best results are obtained by effecting the heating with the emulsion under sufficient pressure that boiling does not occur. A convenient means for conducting the heating step is to pump the emulsion under pressure through a tube which is heated in one section and has a cooling zone following. The rate of flow is regulated so that the residence time in the heating zone gives the desired period of heating. The emulsion is then cooled as rapidly as possible in the cooling zone. Since the heating and cooling involves transfer of considerable amounts of heat, the internal diameter of the tube is chosen in relation to the rate of flow of emulsion therethrough so the flow is turbulent and good heat transfer is thereby obtained. Although best results are secured without boiling, the emulsion may be boiled to accomplish conditioning of the polymer particles by the heating. However, it is essential that polymer particles be maintained in contact with liquid water duuring the whole of the heating period. If the heating is effected by boiling, the loss of part of the water of the emulsion is permissible, but the emulsion cannot be boiled dry because this makes the polymer unsuitable for plastisol use.

The heat treatment of the emulsified polymer is effected without appreciable polymerization of any vinyl chloride therein. Since the time of heating employed to effect the thermal treatment is so brief, there is little opportunity for residual monomeric vinyl chloride to polymerize during the heat treatment. Furthermore, the polymer emulsion, even when taken directly from the polymerization step to the thermal treating step, contains a very low concentration of residual monomer since the polymerization step is ordinarily conducted so there is about an 80 to 95% conversion of monomer to polymer. Although direct transfer between steps may be employed, it is more usual to release the pressure on the polymer emulsion following the polymerization step and this operation enables unpolymerized vinyl chloride to boil off from the emulsion. The reduction in pressure to atmospheric pressure may be effected with the hot emulsion at polymerization temperature (not above 60° C.), or after cooling to atmospheric temperature (about 20° C.), or any temperature therebetween. Such procedure assures a low concentration of residual monomer in the polymer emulsion subjected to heat treatment even though the conversion of monomer to polymer was not high, e. g., only 50%. Additionally, the polymer emulsion from the polymerization step is often allowed to come into contact with air and this effectively inhibits the occurrence of polymerization during the subsequent thermal treating step. By having the polymer emulsion substantially free of monomeric vinyl chloride, i. e., contain less than 10% of the amount of vinyl chloride originally present in the monomer emulsion subjected to polymerization, essentially no polymerization occurs during the heat treating step. Regardless of preliminary procedure, any residual monomer other than vinyl chloride will not be present in sufficient amount in the polymer emulsion during the relatively brief heat treatment to effect the polymeric product adversely for plastisol uses.

After the heat treatment, the polymer emulsion is subjected to a coagulation procedure for the purpose of separating the polymer particles from the liquid medium. Various methods may be used for this purpose such as freezing, treatment with salts, or treatment with lower alcohols. We prefer to effect coagulation with methanol or ethanol which is added in sufficient amount to break the emulsion and precipitate the polymer particles. Addition of about one to four volumes of alcohol per volume of emulsion is effective to coagulate the polymer. The finely divided polymer is then separated by filtration, centrifugation or the like. If desired, it may be washed with additional alcohol. The polymer is dried, preferably at low temperature, e. g., at about 30° C. to 40° C. under vacuum.

The powdery polymer is compounded into a plastisol in usual fashion such as mixing or kneading with about an added 40% to 100% by weight of liquid plasticizer which may be, for example, dibutyl phthalate, dioctyl phthalate, diethyl sebacate, tricresyl phosphate, or the like. Other ingredients may be added, such as stabilizers, dyes, pigments and fillers.

The invention is further illustrated in the following examples, but again the invention is not limited to the described details.

EXAMPLE 3

The heat treatment of emulsified polymer and its marked effect on the viscosity characteristics of aged plastisol therefrom will be illustrated in this example. The polymer was prepared as described in Example 1 except that polymerization of the vinyl chloride was conducted at 45° C. Before polymerization, the vinyl chloride emulsion was homogenized by two passes through the orifice with a pressure drop of 200 pounds per square inch.

Upon completion of the polymerization, the tube was opened and vinyl chloride allowed to degas and escape. About half of the emulsion was placed in a thin walled glass pressure tube and sealed. The emulsion was heat treated by placing the tube in an autoclave where the tube was subjected to heating under steam pressure with live steam at 140° C. for five minutes. The tube was then immediately cooled with a water spray and opened. The polyvinyl chloride was separated from the emulsion and recovered as described in Example 1. The polyvinyl chloride from the other polymer emulsion was recovered in like manner. This emulsion was not given the heat treatment.

Plastisols were prepared from the two batches of polymer by mixing with an added 50% by weight of di(2-ethylhexyl) phthalate. For purposes of comparison, a plastisol of the same composition was prepared from a commercial grade of polyvinyl chloride known as Geon 121 which is marketed especially for use in plastisols. Within an hour's time after preparation, the viscosity of each plastisol was measured at 25° C. with the aid of a Brookfield Syncro-Lectric Viscometer. This instrument was used for measurement of all viscosity values reported herein. The top limit of the viscometer is 100,000 centipoises. A plastisol which has a viscosity of 100,000 centipoises at 25° C. has too thick a consistency to be useful for most practical purposes.

After measurement of the initial viscosity, the plastisols were stored at 25° C. and subsequent viscosity measurements were made at intervals. The results are collected in the following table.

Table I

| Treatment of Resin | Viscosity in Centipoises at 25° C. | | | |
|---|---|---|---|---|
| | Initial | After One Day | After One Week | After One Month |
| Heated at 140° C. for 5 min | 12,000 | 19,000 | 20,000 | 20,000 |
| Not heat-treated | 28,000 | 94,000 | >100,000 | >100,000 |
| Geon 121 | 47,500 | 99,000 | >100,000 | >100,000 |

Figure 2:
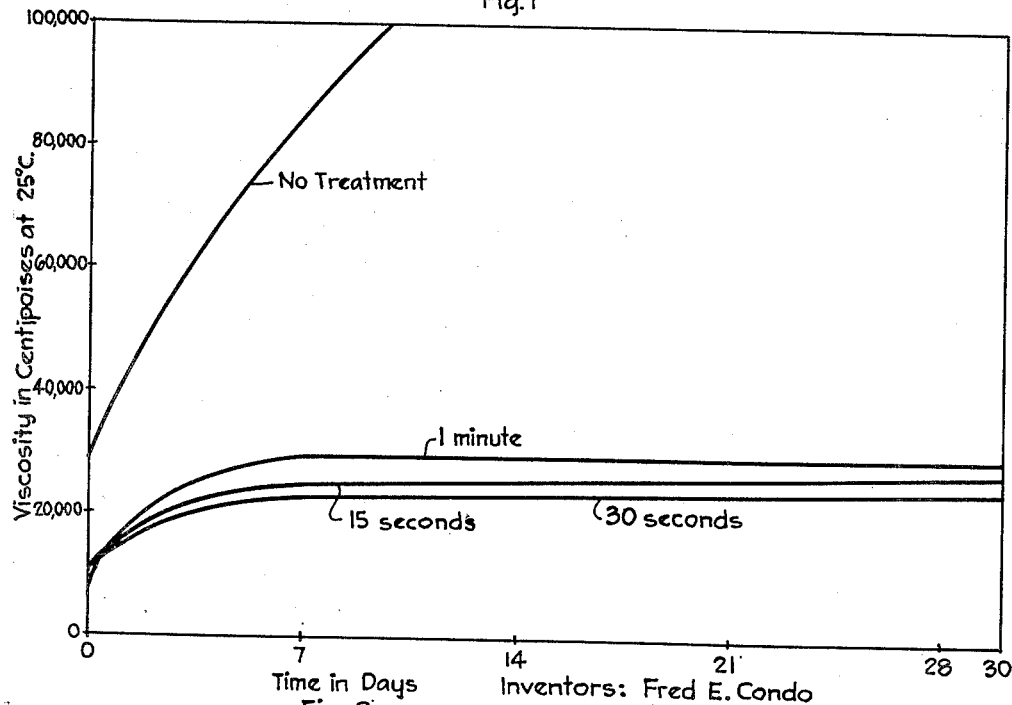

The striking differences between the viscosity characteristics of the plastisol of the invention and those of plastisols from untreated polymer will be better understood from the accompanying drawing which presents graphical plots of the data from Examples 3 and 5 in Figs. 1 and 2, respectively.

As shown in Fig. 1, the thermal treatment of the polymer emulsion lowers the initial viscosity of the plastisol prepared from the polymer. More important is the stabilizing of the plastisol against rapid increase in viscosity with age of the plastisol. As is evident from the graph, the plastisol prepared from untreated polymer soon acquires a very high viscosity so as to have an unworkable consistency. The treated polymer gives a plastisol that retains the desired character of fluid mobility.

EXAMPLE 4

It will be evident from the results given in this example that heating of the polymer emulsion is essential in order to condition the polymer for use in a plastisol. A mixture of 0.3 part of lauroyl peroxide and 0.5 part of lauryl alcohol dissolved in 100 parts of vinyl chloride was emulsified with 300 parts of a 0.5% aqueous solution of sodium lauryl sulfate. The emulsion was homogenized by two passes through the orifice under a pressure drop of 200 pounds per square inch as described in Example 1. The homogenized emulsion was tumbled and heated in a tube at 45° C. for 24 hours to polymerize the vinyl chloride. The tube was opened to vent the unpolymerized vinyl chloride, and the polymer emulsion was divided into three portions. One portion was not treated. The second portion was placed in a vessel at about 25° C. and evacuated until it boiled gently. The gentle boiling was continued for about 6 hours during which time a small amount of water was removed from the emulsion which decreased in temperature to about 15–20° C. owing to the evaporation of water therefrom. The third portion was boiled gently at atmospheric pressure for ten minutes. Only a small amount of water was lost during the treatment. The polymer in each portion was separately recovered with use of freezing in order to induce coagulation. The recovered polymer was washed with methanol and dried at 35° C. under vacuum.

Plastisols were prepared from each portion of dried polymer using one part by weight of di(2-ethylhexyl) phthalate with two parts of polymer. The viscosities of the plastisols were measured initially, and after one day's storage and one week's storage at 25° C. The results are given below in Table II.

Table II

| Polymer Emulsion Treatment | Plastisol Viscosity in Centipoises at 25° C. | | |
|---|---|---|---|
| | Initial | After One Day | After One Week |
| None | 35,000 | 47,000 | 95,000 |
| Boiled at about 15–25° C. for 6 hours | 34,000 | 74,500 | >100,000 |
| Boiled at about 100° C. for 10 minutes | 9,500 | 17,000 | 21,000 |

EXAMPLE 5

The effect of time of heating on the polymer emulsion will be illustrated in this example. An aqueous emulsion of polyvinyl chloride was prepared in the same way as described in Example 5 except that the time for polymerization was shortened to 19 hours. The emulsion was divided into portions and each portion (except a control portion for comparison) was passed through a tubular apparatus under pressure so there was no boiling. The tube had a wall thickness of one millimeter to permit good heat transfer, and was fitted with a heating section followed by a cooling section. The time of thermal treatment of the emulsion was controlled by the rate of passage through the tube. After treatment, the polymer in the emulsions was recovered and compounded into plastisols as described in Example 4. Viscosity measurements were made on the plastisols initially and at intervals after storage at 25° C. The results are collected in Table III.

Table III

| Time of Heating Polymer Emulsion at 140° C. | Plastisol Viscosity in Centipoises at 25° C. | | |
|---|---|---|---|
| | Initial | After One Week | After One Month |
| None | 28,500 | 79,000 | >100,000 |
| 15 seconds | 10,000 | 25,000 | 27,500 |
| 30 seconds | 10,000 | 23,000 | 24,500 |
| 1 minute | 7,000 | 29,500 | 30,000 |

The foregoing results are presented in Fig. 2 of the drawing as a graphical plot with notations of the time of heating. As is evident therefrom, the thermal treatment of the polymer emulsion conditions the polymer so the plastisol has lower initial viscosity and retains a low viscosity upon storage. The untreated polymer gives a plastisol which rapidly increases in viscosity to a point where it is no longer useful.

EXAMPLE 6

As aqueous emulsion of polyvinyl chloride prepared as described in Example 5 was given thermal treatment in the tubular apparatus previously noted. The temperature of treatment in this case was 110° C. Plastisols prepared from the polymer and containing 33% by weight of di(2-ethylhexyl) phthalate had the viscosities thereof measured as given in Table IV.

Table IV

| Time of Heating Polymer Emulsion at 110° C. | Plastisol Viscosity in Centipoises at 25° C. | | |
|---|---|---|---|
| | Initial | After One Week | After One Month |
| None | 28,500 | 79,000 | >100,000 |
| 30 seconds | 9,500 | 24,000 | 26,500 |
| 1 minute | 6,000 | 13,500 | 17,000 |

EXAMPLE 7

Use of an ammonium salt as emulsifying agent is illustrated in this example. A mixture of 0.3 part lauroyl peroxide, 1.4 parts lauric acid and 0.5 part lauryl alcohol dissolved in 100 parts of vinyl chloride was mixed with 300 parts of water containing 0.09 part of ammonia. Ammonium laurate formed in situ by the mixing. The emulsion was passed twice through the orifice of the homogenizing apparatus described in Example 1 with use of a pressure drop across the orifice of 200 pounds per square inch. The homogenized emulsion was heated in a tumbling tube for 18 hours at 45° C. to effect polymerization of the vinyl chloride after which the tube was opened to allow escape of a small amount of unpolymerized vinyl chloride. The polymer emulsion was divided into two portions. One portion was sealed in a thin walled glass tube which was heated under pressure with live steam at 140° C. for 5 minutes. The other portion was gently boiled at 100° C. for 10 minutes. The polymer of each was coagulated by freezing and recovered. Plastisols were prepared from the polymers using two parts of dry polymer with one part of di(2-ethylhexyl) phthalate. The viscosities of the plastisols were measured initially and at intervals after storage at 25° C. The results are given in Table V.

Table V

| Heat Treatment of Polymer Emulsion | | Plastisol Viscosity in Centipoises at 25° C. | | | |
|---|---|---|---|---|---|
| Time | Temp., °C. | Initial | After One Day | After One Week | After One Month |
| 5 min | 140 | 9,500 | 16,000 | 19,000 | 24,000 |
| 10 min | 100 | 10,000 | 12,000 | 14,000 | 15,500 |

EXAMPLE 8

Applicability of the process with use of another emulsifying agent is illustrated in this example. The emulsifying agent employed was a sodium alkylbenzene sulfonate (Nacconol NRSF). A solution of 0.3 part of lauroyl peroxide in 100 parts of vinyl chloride was emulsified with 300 parts of water containing 0.5 part of the emulsifying agent. The emulsion was homogenized and the monomer polymerized as described in Example 1. The polymerization was effected for 22 hours at 45° C. The polymerization tube was opened, the small amount of vinyl chloride gas vented therefrom, and the degassed emulsion transferred to and sealed in a thin-walled glass tube. The tube was heated with live steam under pressure for 5 minutes at 140° C., and then rapidly cooled. The emulsion was coagulated with methanol and the finely divided polyvinyl chloride recovered. The polymer was compounded with an added 50% di(2-ethylhexyl) phthalate into a smooth plastisol. The initial viscosity of the plastisol was 16,000 centipoises at 25° C., and after storage for one month at 25° C., the viscosity had increased to only 25,000 centipoises at 25° C.

We claim as our invention:

1. A process for producing polymer of vinyl chloride adapted for production of plastisols which retain mobile fluidity upon storage over extended periods of time which comprises the combination of steps in seriatim of emulsifying liquid momomeric vinyl chloride having not more than about 5% by weight of another mono-olefinic polymerizable compound in admixture therewith and also containing a peroxide polymerization catalyst dissolved therein with an aqueous solution containing about 0.1 to 5% by weight of an emulsifying agent, homogenizing the emulsion by subjecting it to violent shearing action, heating the homogenized emulsion with agitation at a temperature of about 30° C. to 60° C. to thereby polymerize the vinyl chloride, venting unpolymerized vinyl chloride from the emulsion and thereby substantially freeing the polymer emulsion of unpolymerized vinyl chloride, and then subsequently heating the uncoagulated aqueous emulsion of polymer at a temperature of about 90° C. to 160° C. for a time from about 10 seconds to 10 minutes, but less than the time required to appreciably agglomerate and coagulate the polymer particles while maintaining the polymer in intimate contact with liquid water during the whole of this heating period.

2. A process for producing polymer of vinyl chloride adapted for production of plastisols which retain mobile fluidity upon storage over extended periods of time which comprises the combination of steps in seriatim of emulsifying liquid monomeric vinyl chloride having not more than about 5% by weight of another polymerizable compound having one vinylidene radical as sole polymerizable group therein and also containing about 0.1 to 5% by weight of a peroxide polymerization catalyst dissolved therein with about 200 to 500% by weight based upon the weight of said mixture of an aqueous solution containing about 0.1 to 2% by weight of an emulsifying agent, homogenizing the emulsion by passage of the emulsion at least once through an aperture of not above about 0.03 inch diameter at such rate that there is a pressure drop of above 100 pounds per square inch across the aperture, maintaining the homogenized emulsion while agitating at a temperature of about 30° C. to 60° C. to polymerize the majority of the vinyl chloride, venting unpolymerized vinyl chloride from the emulsion at not above 60° C. by releasing the pressure on the emulsion to about atmospheric pressure and thereby substantially free the polymer emulsion of unpolymerized vinyl chloride, and then heating the uncoagulated aqueous emulsion of polymer prior to coagulation at a temperature of about 90° C. to 160° C. for a time from about 10 seconds to 10 minutes, but less than the time which causes appreciable agglomeration and coagulation of the polymer particles, the polymer being maintained in intimate contact with liquid water during the whole of this heating period.

3. A process for producing polyvinyl chloride adapted for use in plastisols which retain mobile fluidity upon storage over extended periods of time which comprises the combination of steps in seriatim of emulsifying a liquid solution of vinyl chloride as sole polymerizable compound containing a peroxide polymerization catalyst dissolved therein with an aqueous solution containing about 0.1 to 5% by weight of an emulsifying agent, homogenizing the emulsion by subjecting it to violent shearing action, heating the homogenized emulsion with agitation at a temperature of about 30° C. to 60° C. to thereby polymerize the vinyl chloride, venting unpolymerized vinyl chloride from the emulsion and thereby substantially freeing the polymer emulsion of unpolymerized vinyl chloride, and then subsequently heating the uncoagulated aqueous emulsion of polymer at a temperature of about 90° C. to 160° C. for a time from about 10 seconds to 10 minutes, but less than the time required to appreciably agglomerate and coagulate the polymer particles while maintaining the polymer in intimate contact with liquid water during the whole of this heating period.

4. A process for producing polyvinyl chloride adapted for use in plastisols which retain mobile fluidity upon storage over extended periods of time which comprises the combination of steps in seriatim of emulsifying a liquid solution of monomeric vinyl chloride as sole polymerizable compound containing about 0.1 to 5% by weight of a peroxide polymerization catalyst dissolved therein with about 200 to 500% by weight based upon the weight of said mixture of an aqueous solution containing about 0.1 to 2% by weight of an emulsifying agent, homogenizing the emulsion by passage of the emulsion at least once through an aperture of about 0.005 to 0.03 inch diameter at such rate that there is a pressure drop of above 100 pounds per square inch across the aperture, maintaining the homogenized emulsion while agitating at a temperature of about 30° C. to 60° C. to polymerize the majority of the vinyl chloride, venting unpolymerized vinyl chloride from the emulsion at about said polymerization temperature by releasing the pressure on the emulsion to about atmospheric pressure and thereby substantially free the polymer emulsion of unpolymerized vinyl chloride, and then heating the aqueous emulsion of polymer prior to coagulation at a temperature of about 100° C. to 140° C. for a time from about 10 seconds to 10 minutes, but less than the time which causes appreciable agglomeration and coagulation of the polymer particles, the polymer being maintained in intimate contact with liquid water during the whole of this heating period.

5. A process for producing polyvinyl chloride adapted for use in plastisols which retain mobile fluidity upon storage over extended periods of time which comprises the combination of steps in seriatim of emulsifying a liquid solution of monomeric vinyl chloride as sole polymerizable compound containing about 0.2 to 1% of peroxide polymerization catalyst dissolved therein with about 250 to 400% by weight based upon the weight of said solution of an aqueous solution containing about 0.1 to 2% by weight of an ionic emulsifying agent containing 10 to 20 carbon atoms, homogenizing the emulsion by passing it at least once through an aperture of about 0.005 to 0.03 inch diameter at such rate that there is a pressure drop of above 100 pounds per square inch across the aperture, heating the homogenized emulsion with agitation at a temperature of about 40° C. to 45° C. to polymerize substantially all of the vinyl chloride, boiling unpolymerized vinyl chloride from the emulsion at a temperature not in excess of about 60° C. to substantially free the emulsion of this substance, and then heating the aqueous emulsion of polymer prior to coagulation at a temperature of about 100° C. to 140° C. for a time which will give a plastisol consisting essentially of two parts by weight of dry polymer and one part by weight of di(2-ethylhexyl) phthalate that retains a viscosity of less than 40,000 centipoises at 25° C. after storage of the plastisol for 30 days at about 25° C., the polymer particles being maintained in intimate contact with liquid water during the whole of the heating at about 100° C. to 140° C. and the time of heating being from 10 seconds to 5 minutes.

6. A process for producing polyvinyl chloride adapted for use in plastisols which retain mobile fluidity upon storage over extended periods of time which comprises the combination of steps in seriatim of emulsifying a liquid solution of monomeric vinyl chloride as sole polymerizable compound containing about 0.3% by weight of lauroyl peroxide and about 0.5% by weight of lauryl alcohol dissolved therein with about 300% by weight based upon the weight of said solution of an aqueous solution containing about 0.5% by weight of sodium lauryl sulfate, homogenizing the emulsion by two passes through an aperture of about 0.016 inch diameter at such rate that there is a pressure drop across the aperture of about 200 pounds per square inch, maintaining the homogenized emulsion while agitating at a temperature of about 40° C. to 45° C. to polymerize substantially all of the vinyl chloride, venting unpolymerized vinyl chloride from the polymer emulsion at about said polymerization temperature by releasing the pressure on the emulsion to about atmospheric pressure and thereby substantially free the polymer emulsion of unpolymerized vinyl chloride, and then heating the aqueous emulsion of polymer prior to coagulation at a temperature of about 140° C. without boiling for a time of about 15 seconds to 5 minutes.

References Cited in the file of this patent
UNITED STATES PATENTS

| Number | Name | Date |
|---|---|---|
| 2,068,424 | Mark | Jan. 19, 1937 |